(12) United States Patent
Järvi et al.

(10) Patent No.: US 9,050,986 B2
(45) Date of Patent: Jun. 9, 2015

(54) ROLL CONTAINER

(71) Applicant: K. Hartwall Oy Ab, Söderkulla (FI)

(72) Inventors: Mikko Järvi, Söderkulla (FI); Andrew Clark, Söderkulla (FI)

(73) Assignee: K. HARTWALL OY AB, Soderkulla (FI)

( * ) Notice: Subject to any disclaimer, the term of this patent is extended or adjusted under 35 U.S.C. 154(b) by 0 days.

(21) Appl. No.: 14/039,840

(22) Filed: Sep. 27, 2013

(65) Prior Publication Data

US 2014/0091541 A1    Apr. 3, 2014

(30) Foreign Application Priority Data

Sep. 28, 2012  (GB) .................................. 1217337.3

(51) Int. Cl.
*B62B 3/00* (2006.01)
*B62B 5/00* (2006.01)

(52) U.S. Cl.
CPC ............... *B62B 3/002* (2013.01); *B62B 5/0013* (2013.01); *B62B 3/004* (2013.01); *B62B 2202/64* (2013.01)

(58) Field of Classification Search
CPC .......... B62B 1/00; B62B 1/268; B62B 13/18; B62B 3/00; B62B 3/002
USPC .............. 280/47.35, 79.3, 79.2, 79.5, 33.995, 280/33.996, 47.34
See application file for complete search history.

(56) References Cited

U.S. PATENT DOCUMENTS

| | | | | |
|---|---|---|---|---|
| 3,288,484 A | * | 11/1966 | Brunette | ...................... 280/79.2 |
| 3,861,768 A | * | 1/1975 | Wilson | ..................... 280/33.996 |
| 3,953,044 A | | 4/1976 | Wilson | |
| 4,045,043 A | * | 8/1977 | Fourrey | ........................ 280/79.3 |
| 4,065,141 A | * | 12/1977 | Wilson | ..................... 280/33.996 |
| 4,222,579 A | * | 9/1980 | Frydendal | ................. 280/33.996 |
| 4,275,665 A | * | 6/1981 | Silverman | ..................... 280/79.3 |
| 4,416,463 A | * | 11/1983 | Marsh | ........................... 280/79.3 |
| D546,019 S | * | 7/2007 | James | ............................ D34/21 |
| 8,764,031 B2 | * | 7/2014 | Finstad et al. | ............. 280/47.35 |

FOREIGN PATENT DOCUMENTS

| | | |
|---|---|---|
| EP | 0 476 970 A1 | 3/1992 |
| FR | 2 5777 202 A1 | 8/1986 |
| NL | 8501404 A | 12/1986 |
| RU | 2304552 C1 | 8/2007 |

OTHER PUBLICATIONS

Decision on Granting a Patent for Invention issued in a corresponding Russian Application No. 2013142883/11 dated Feb. 26, 2015 (4 pages).

* cited by examiner

*Primary Examiner* — Hau Phan
(74) *Attorney, Agent, or Firm* — Birch, Stewart, Kolasch & Birch, LLP (57) ABSTRACT

A roll container is suitable for transporting post, namely letters. The novel roll container includes two opposing parallel side wall frames, wherein the front ends of the side wall frames define the width of the front opening of the roll container. The roll container also includes a door, and a hinge which connects the door to one of the side wall frames. The door includes a lower portion and an upper portion which is arranged slidably to tracks provided to the lower portion. The roll container further includes a device configured to lock the upper portion of the door to the front end of the side wall frames at different heights.

20 Claims, 8 Drawing Sheets

ROLL CONTAINER

FIELD OF THE INVENTION

The present invention relates to logistics equipment. In particular, the invention relates to roll containers suitable for containing and transporting sheet-like items, namely letters.

BACKGROUND ART

Roll containers are typically used for temporary storage and transport of parceled goods. Roll containers are wheeled cage-like pallets which are prismatic for maximizing the inner volume while minimizing outer dimensions. When transporting poorly stacking parcels, such as sheet-like items—e.g. letters—it is important to be able to load the container to the brim, but also to be able to empty the fully loaded container. In this respect, conventional roll containers have been found impractical for transporting post, namely letters, as unloading is a burden due to the topmost letters pouring out from a slightly opened door.

AIM OF THE INVENTION

It is therefore an aim of the present invention to provide a roll container which is suitable for transporting a full load of poorly stacking parcels. It is a particular aim to provide a roll container which is suitable for transporting a full load of post, namely letters.

SUMMARY

The aim of the present invention is achieved with a novel roll container which includes two opposing parallel side wall frames, wherein the front ends of the side wall frames define the width of the front opening of the roll container. The roll container also includes a door, and a hinge which connects the door to one of said side wall frames. The door includes a lower portion and an upper portion which is adapted slidably to tracks provided to the lower portion. The roll container further includes means for locking the upper portion of the door to the front end of the side wall frames at different heights.

BENEFITS

Considerable benefits are gained with aid of the present invention. As the top portion of the door may be lowered gradually towards the lower portion, poorly stacking items such as letters are maintained in good, controlled form without pouring out when opening the door to unload the roll container. The door may therefore be opened step by step from the top downwards thus avoiding letters, for example, from spilling out.

BRIEF DESCRIPTION OF DRAWINGS

In the following exemplary embodiments of the invention are described in greater detail with reference to the accompanying drawings, in which.

DETAILED DESCRIPTION OF EXAMPLARY EMBODIMENTS

Figure 1:
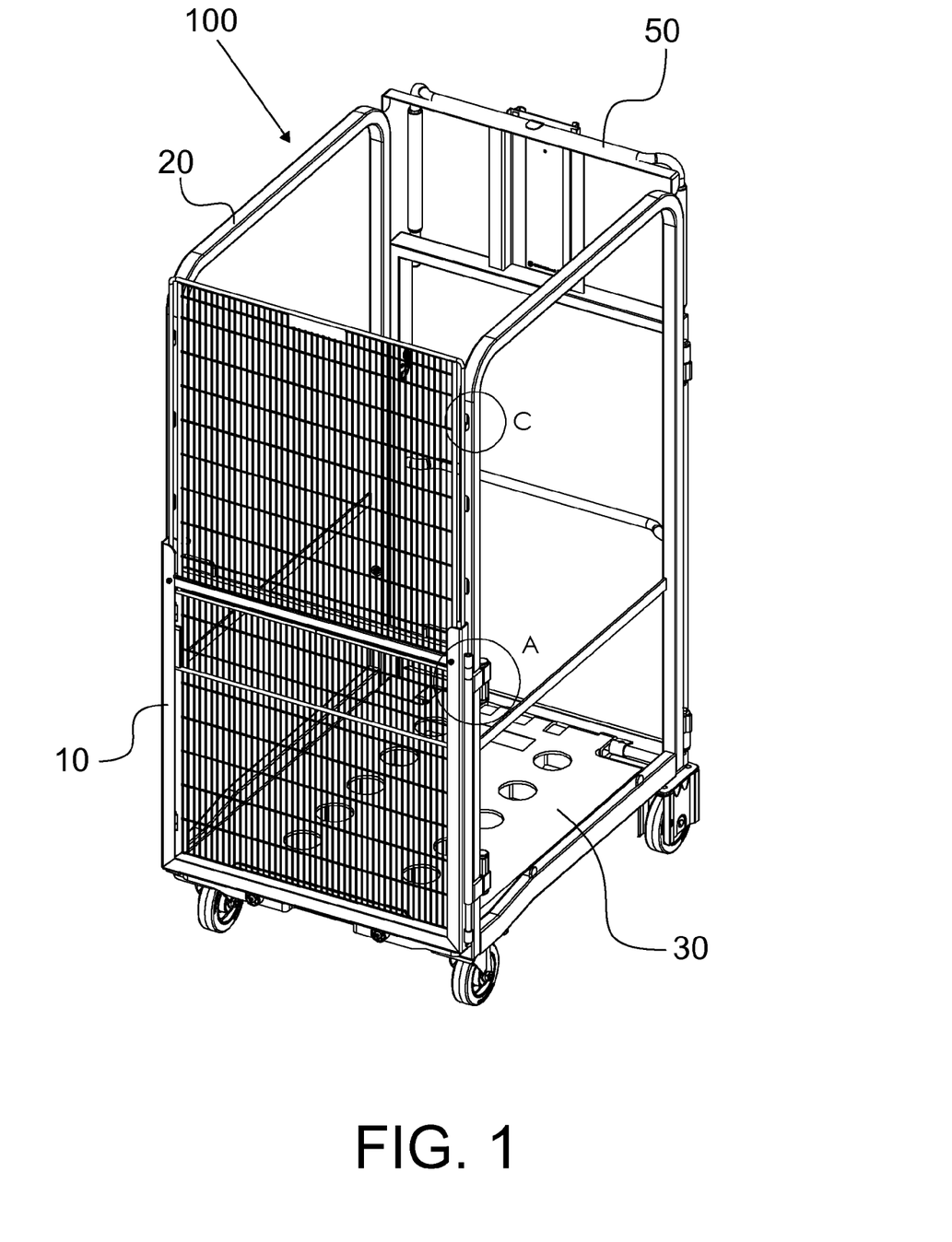
FIG. 1 shows an isometric view of a roll container according to one embodiment in fully closed configuration, wherein the mesh of the container has been omitted from the side walls for the sake of clarity.

FIG. 1 illustrates a roll container 100 according to one embodiment featuring two opposing parallel side wall frames 20 which—unlike presented in the drawings—have a mesh or similar closing structure to prevent items from falling off the sides of the container.

The front ends of the side wall frames 20 define the width of the front opening of the roll container 100. The front opening of the roll container 100 is defined from below by a floor element 30 which is also a closed panel from keeping small objects inside the container 100. The container 100 is closed from the rear by a rear wall 50 which too includes a closing element, such as a mesh, for keeping small parcels within the container 100.

In this context, the front of the roll container 100 means the face or side of the container which is intended for loading and unloading. Conversely, the rear of the roll container 100 means the side or face or wall of the container opposite to the front. Side walls are the panel elements connecting the front side and rear wall in a mutually parallel manner and orthogonally in respect to the front and rear sides or faces. The top side of the container 100 is illustrated as being open, but it may also include a fixed or pivoting top wall (not shown) for closing the top side or for accessing the contents of the container from above, respectively. The side and rear walls as well as the bottom and top of the roll container 100 are therefore substantially closed.

Figure 2:
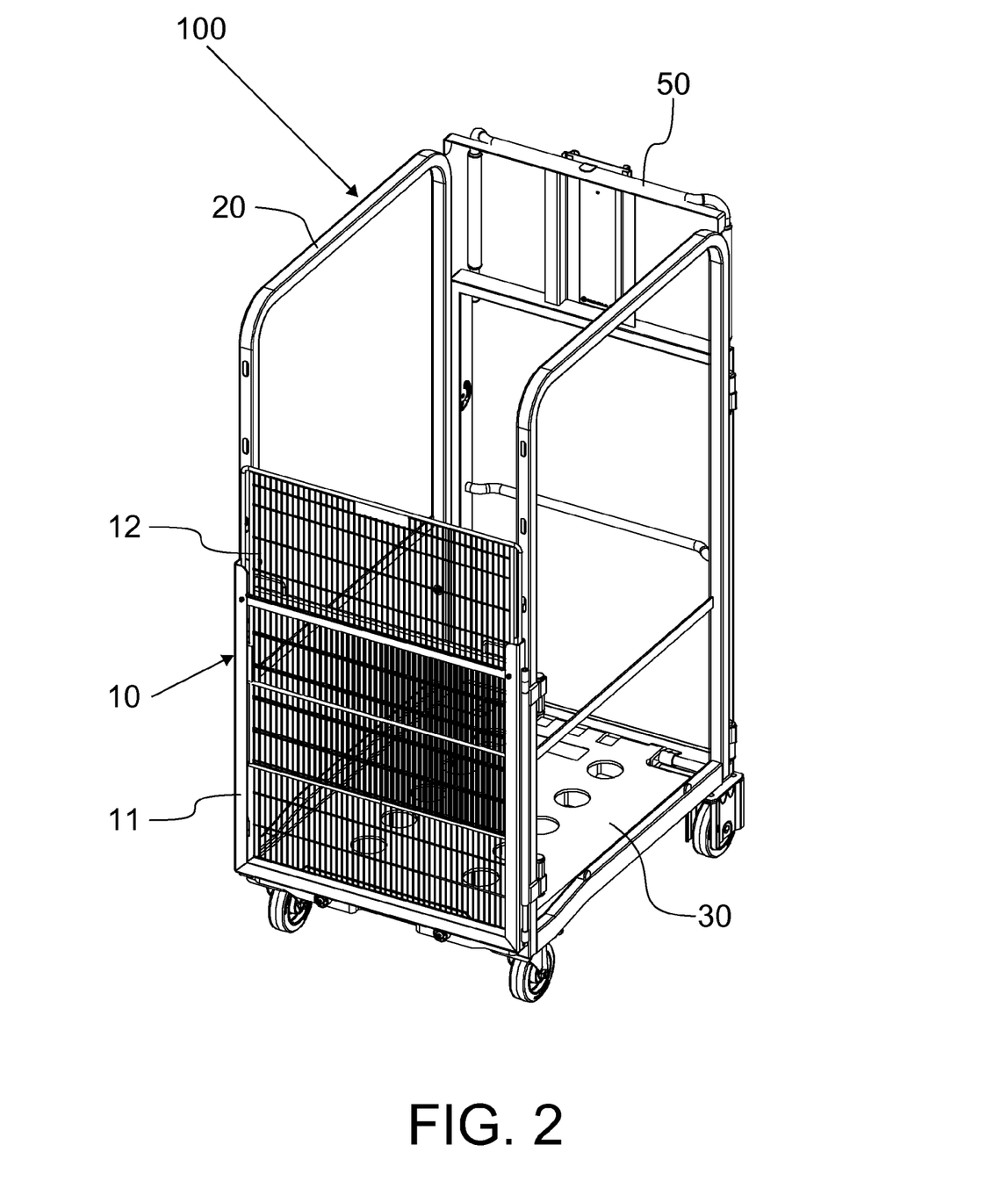
FIG. 2 shows the roll container of FIG. 1 in partly lowered configuration.

The roll container 100 includes a door 10 which is connected to one side wall frame 20 (the right side wall frame in FIGS. 1 to 4) through a hinge 40. The door 10 has a lower portion 11, which comprises vertical tracks for receiving a closing panel in a sliding fashion. The tracks may be an opposing pair of grooves provided, for example, as two profiles both having a C-shaped cross-section opening towards each other. The door 10 also includes an upper portion 12 which is adapted slidably to the tracks of the lower portion 11 for acting as said closing panel. The upper portion 12 is dimensioned to be dropped down in the tracks to be aligned with the lower portion. Accordingly, the upper portion 12 is configured to be set to different heights in respect to the lower portion 11. In the topmost position (FIG. 1), the door 10 as a whole covers the front side of the roll container 100 with the upper portion 12 reaching the top edge of the side wall frames 20. In a lowered or intermediate position (FIG. 2), the upper portion 12 is gradually moved towards the lower position 11, whereby the top portion of the inner volume of the container 100 is accessible for unloading the topmost items without them falling out. This is a major improvement compared to conventional roll container doors which only open sideways. In the lowest position (FIG. 3), the upper portion 12 is embedded within the lower portion 11 for exposing the upper half of the container 100 for further unloading items from the container.

The roll container 100 therefore includes means for locking the upper portion 12 to the front end of the side wall frames 20 at different heights. Said means includes cooperating shapes 13, 21 provided to the upper portion 12 of the door 10 and to the front end of the side wall frame 20. As best shown in FIGS. 1 to 3 and 7, the locking means feature protrusions 13 arranged to the upper portion 12 of the door and corresponding receiving openings 21 provided the front end surfaces of the side wall frames 20 at different heights. In the example shown in the Figs., the side wall frames 20 include three superposed opening pairs 21 for locking the upper portion 12 at three different heights, whereby the fourth position is the lowest position illustrated in FIG. 3.

Figure 3:
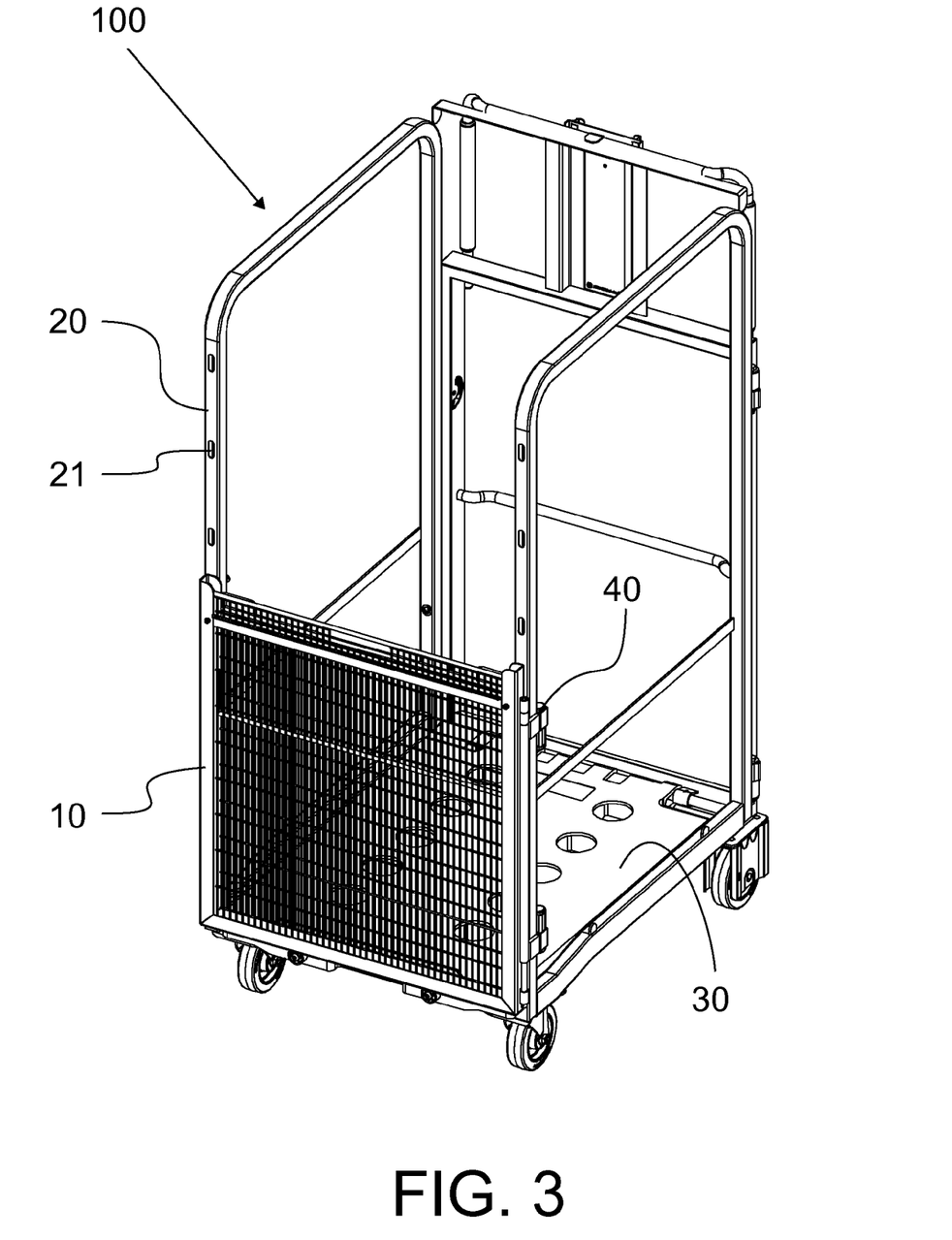
FIG. 3 shows the roll container of FIG. 1 with a fully lowered guilliotine door.
Figure 4:
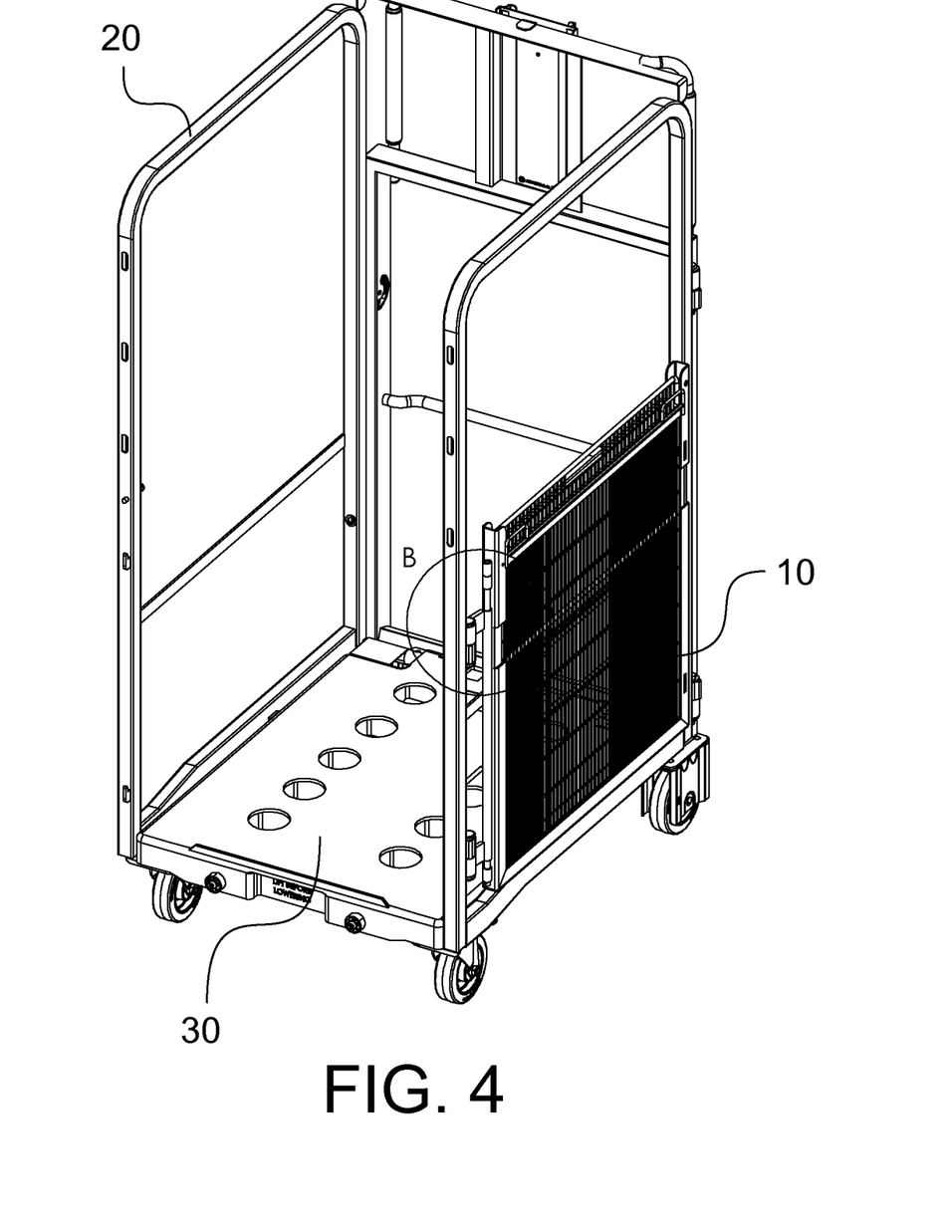
FIG. 4 shows the roll container of FIG. 1 in a fully opened and locked configuration.

Referring now to FIGS. 3 to 6 which depict the hinge 40 of the roll container in greater detail. The hinge 40 connects the door 10 to the side wall frame 20 such that the hinge 40 is configured to pivot the door 10 between a closed and open position. In the closed position, the door 10 orthogonally connects the side wall frames 20 over the width of the front opening of the roll container 100 (FIG. 3). To open the door, the hinge 40 guides the door 10 through a rotation movement to be adjacent and parallel to the side wall frames 20 (FIG. 4).

Figure 5:
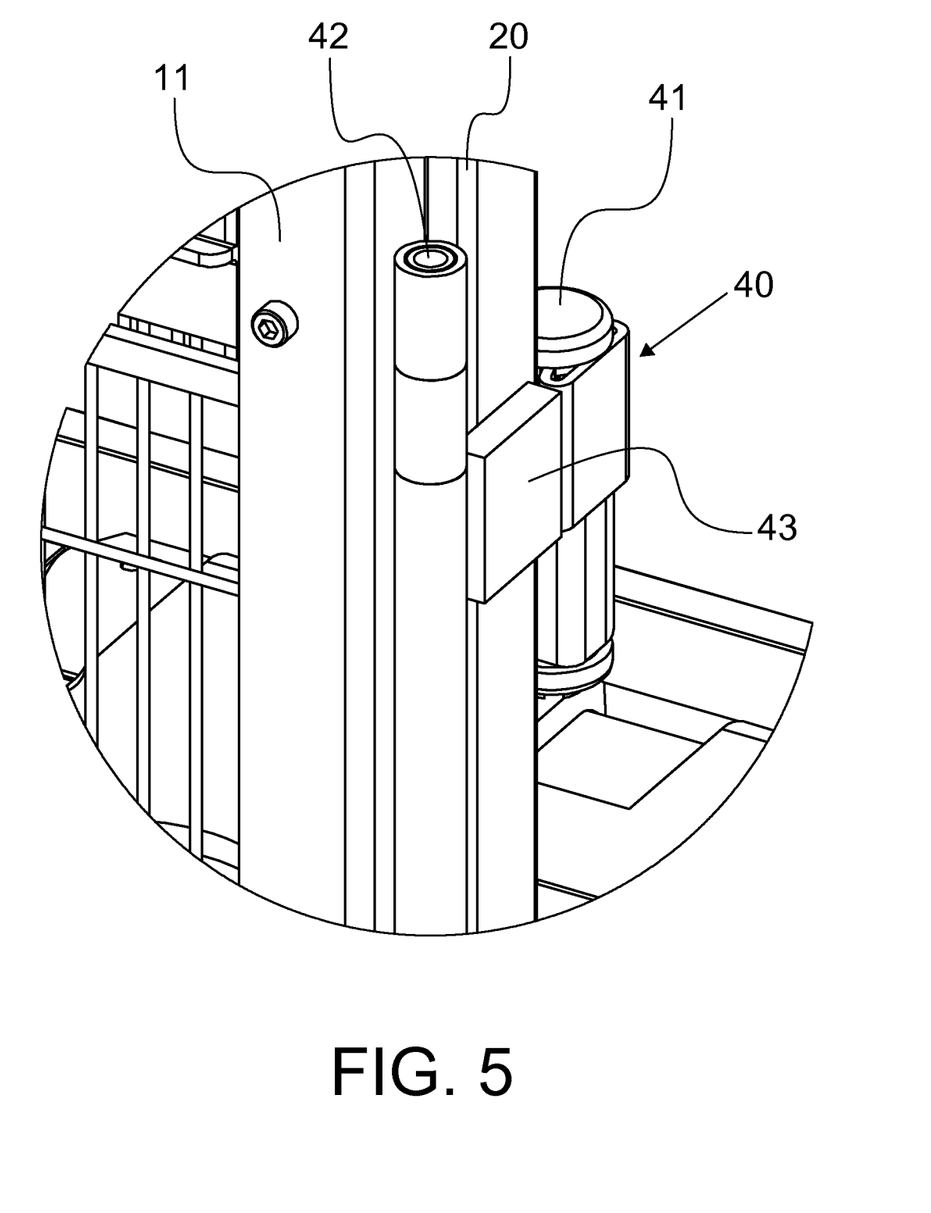
FIG. 5 shows a detail view A of the hinge of FIG. 1.
Figure 6:
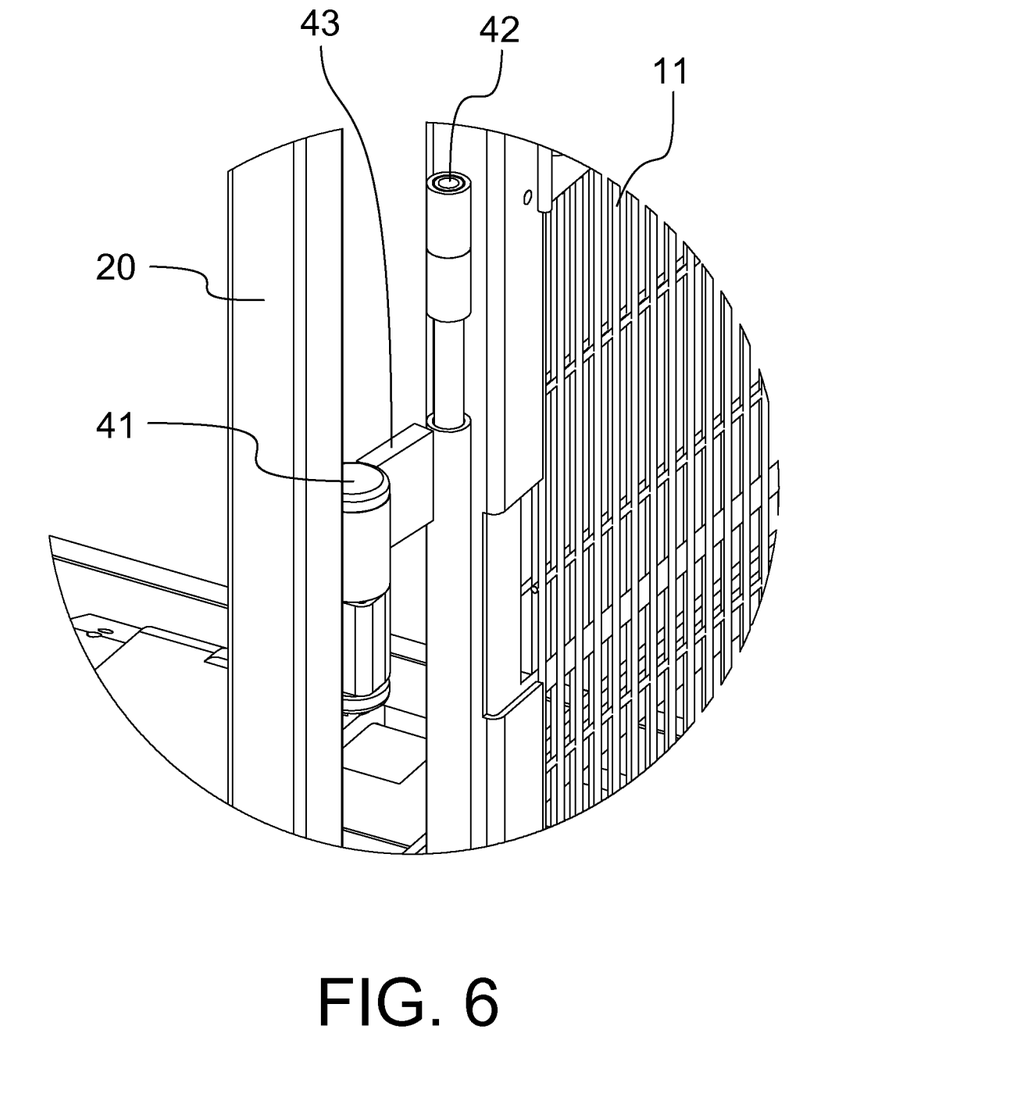
FIG. 6 shows a detail view B of the hinge of FIG. 4.
Figure 7:
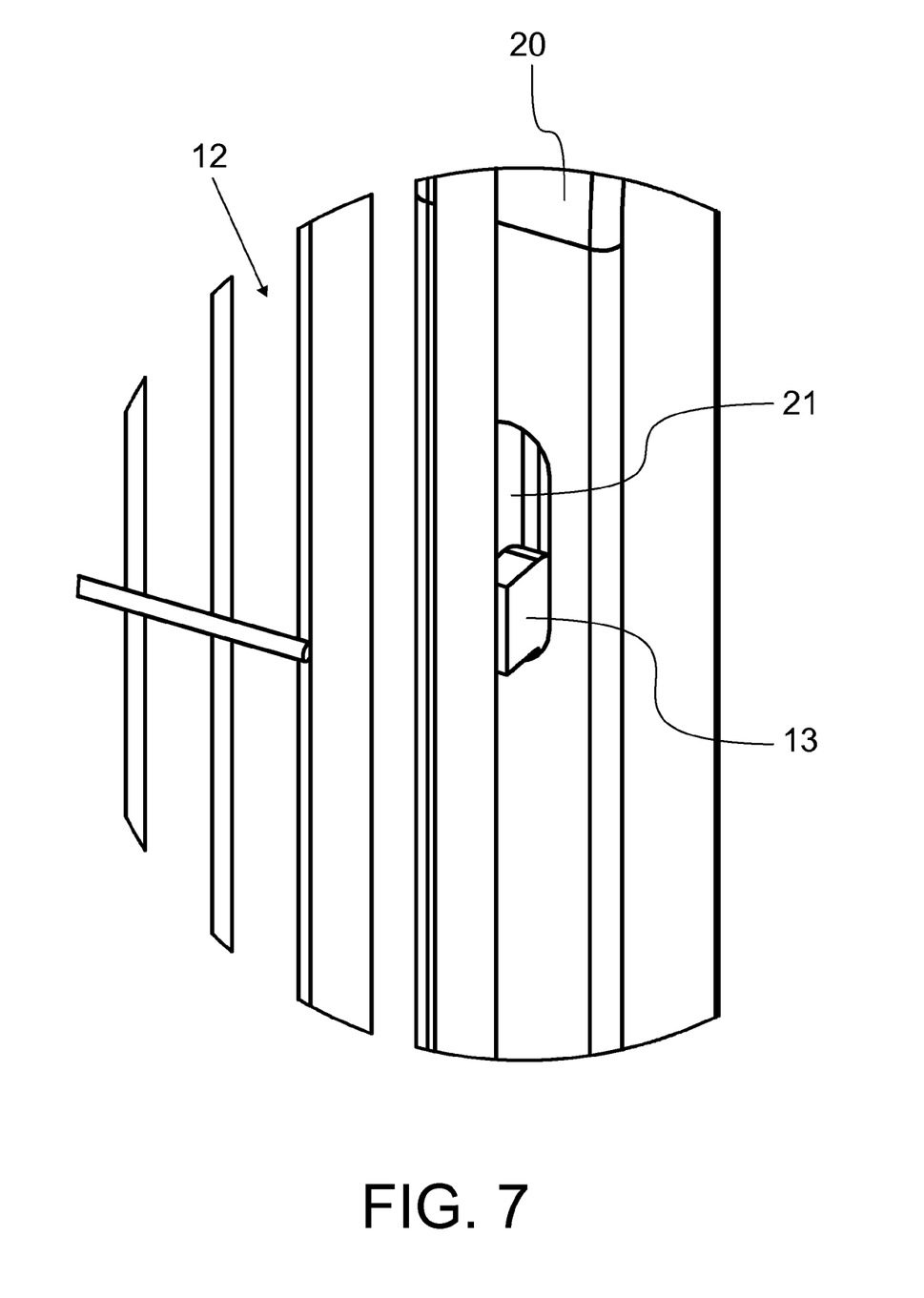
FIG. 7 shows a detail view C of the locking means of the upper portion of the door of FIG. 1.

As seen from FIGS. 5 and 6, the hinge 40 has two rotation axes 41, 42. The first rotation axis 41 is arranged to the rear side surface of the side wall frame 20 and a second rotation axis 42 is arranged to front side surface of the lower portion 11 of the door 10. The rotation axes 41, 42 are provided with a conventional hinge having a mutually rotating pin and socket. The rotation axes 41, 42 distanced from one another by means of a horizontal arm 43 which extends between the axes 41, 42. The arm 42 is designed to receive and withstand lateral impacts as opposed to the rotation axes 41, 42. For this reason the arm 43 is configured such to be adjacent to a lateral side surface of the side wall frame 20 when the door 10 is closed (FIG. 5). In case the roll container 100 was subjected to lateral impacts, the arm 43 resting against the side wall frame 20 would receive the impact leaving the rotation axes 41, 42 free of stress.

As best shown in FIG. 6, the second rotation axis 42 is constructed to allow vertical movement between the arm 43 and the lower portion 11 of the door 10 for the following reason. The side wall frame 20, to which the door is pivoted, comprises an outer horizontal beam being dimensioned such that a flanked door 10 having the upper and lower portions 11, 12 aligned is protected by said beam from lateral impacts.

Figure 8:
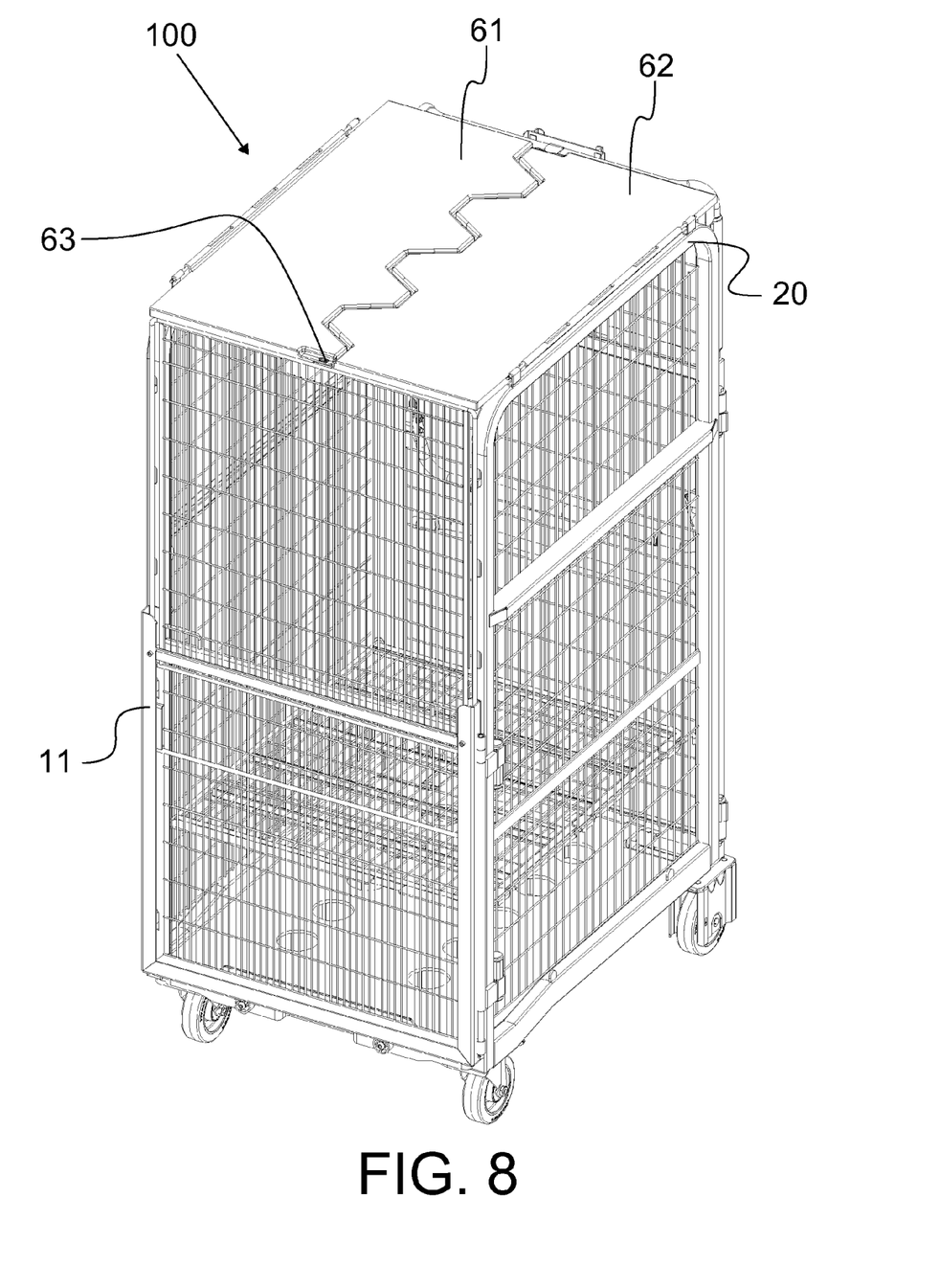
FIG. 8 shows an isometric view of the roll container of FIG. 1 also showing the mesh of the frames as well as additional security panels provided to the top portion of the container.

According to one embodiment shown in FIG. 8, the roll container 100 has been equipped with two interlocking security panels 61, 62. The security panels 61, 62 are used to close the top side of the roll container 100 for inhibiting access into the roll container 100. This feature is especially useful in roll containers 100 produced for postal purposes as the locking panels 61, 62 provide for decreased risk of theft and in any case indicate any sign of theft should the panels 61, 62 be broken. FIG. 8 also shows the meshing in the door and fames of the roll container 100.

The security panels 61, 62 are at one end hinged to upper portions of opposing side wall frames 20. The other ends of the security panels 61, 62, i.e. the free ends, are shaped with cooperating locking contours such that when the panels 60 are pivoted about said hinges to a horizontal alignment, the cooperating shapes of the panels make contact and form a closed seam across the top portion of the roll container 100. In the example shown in FIG. 8, the seam has a serrated form, wherein the opposing security panels 61, 62 interlock to each other. At least one or both of the panels 61, 62 is/are equipped with a locking interface 63 to the roll container for securing the panels 61, 62 to a locked horizontal position. According to one embodiment the security panel 61 shown left in FIG. 8 is equipped with a hole 63 through which the panel 61 may be locked to the upper portion 12 of the door 10 by means of a lock, for example. Thus the other security panel 62 shown right in FIG. 8 is also secured to a locked horizontal position by the first panel 61 which is locked to the door 10. Other locking interfaces for securing the panels 61, 62 to the upper portion 12 of the door 10 are also possible, for example locking clamps, strips etc. (not shown).

TABLE 1

LIST OF REFERENCE NUMBERS.

| Number | Part |
|---|---|
| 10 | door |
| 11 | lower portion |
| 12 | upper portion |
| 13 | locking protrusion |
| 20 | side wall frame |
| 30 | bottom |
| 40 | hinge |
| 41 | first hinge axis |
| 42 | second hinge axis |
| 43 | arm |
| 50 | rear wall |
| 61, 62 | security panel |
| 63 | locking interface |

The invention claimed is:

1. A roll container comprising:
   two opposing parallel side wall frames, front ends of which define a width of a front opening of the roll container,
   a door having a lower portion with vertical tracks, and an upper portion slidably received within the vertical tracks of the lower portion, said upper portion being movable within said vertical tracks from a lowered position to a raised position,
   a hinge connecting the lower portion of the door to one of said side wall frames, and
   means for selectively locking the upper portion to the front ends of the side wall frames at different heights from said lowered position to said raised position.

2. The roll container according to claim 1, wherein the means for locking the upper portion to the front end of the side wall frames at different heights comprises cooperating shapes provided to the upper portion of the door and to the front ends of the side wall frame.

3. The roll container according to claim 2, wherein said means for locking the upper portion to the front end of the side wall frames at different heights comprise at least one protrusion arranged to the upper portion and corresponding receiving openings provided the front end surfaces of the side wall frames at different heights.

4. The roll container according to claim 2, wherein the hinge connects the door to one of said side wall frames such that the hinge is configured to pivot the door to a:
   closed position, wherein the door orthogonally connects the side wall frames over the width of the front opening of the roll container, and to a
   flanked position, wherein the door is guided through a rotation movement to be adjacent and parallel to the side wall frames which the door hinged to.

5. The roll container according to claim 1, wherein said means for locking the upper portion to the front ends of the side wall frames at different heights comprise at least one protrusion arranged to the upper portion and corresponding receiving openings provided the front end surfaces of the side wall frames at different heights.

6. The roll container according to claim 5, wherein the front end surfaces of the side wall frames comprise at least three receiving openings at different heights.

7. The roll container according to claim 5, wherein the hinge connects the door to one of said side wall frames such that the hinge is configured to pivot the door to a:
   closed position, wherein the door orthogonally connects the side wall frames over the width of the front opening of the roll container, and to a
   flanked position, wherein the door is guided through a rotation movement to be adjacent and parallel to the side wall frames which the door hinged to.

8. The roll container according to claim 6, wherein the hinge connects the door to one of said side wall frames such that the hinge is configured to pivot the door to a:
   closed position, wherein the door orthogonally connects the side wall frames over the width of the front opening of the roll container, and to a
   flanked position, wherein the door is guided through a rotation movement to be adjacent and parallel to the side wall frames which the door hinged to.

9. The roll container according to claim 1, wherein the hinge connects the door to one of said side wall frames such that the hinge is configured to pivot the door to a:
   closed position, wherein the door orthogonally connects the side wall frames over the width of the front opening of the roll container, and to a
   flanked position, wherein the door is guided through a rotation movement to be adjacent and parallel to the side wall frames which the door hinged to.

10. The roll container according to claim 9, wherein the hinge comprises two rotation axes.

11. The roll container according to claim 10, wherein a first rotation axis of said rotation axes is arranged to the rear side surface of the side wall frame and a second rotation axis is arranged to front side surface of the lower portion of the door.

12. The roll container according to claim 11, wherein said rotation axes are arranged at a horizontal distance from one another by means of an arm which is configured to be adjacent to a lateral side surface of the side wall frame when the door is closed for controllably receiving lateral impacts.

13. The roll container according to claim 9, wherein the roll container comprises interlocking security panels which are configured to close the top side of the roll container for inhibiting access into the roll container.

14. The roll container according to claim 13, wherein the roll container comprises two interlocking security panels which:
   are at one end hinged to upper portions of opposing side wall frames, the other ends of the security panels being shaped with cooperating locking contours,
   comprise a locking interface to the roll container for securing the panels to a locked horizontal position.

15. The roll container according to claim 14, wherein the locking interface is a hole provided to at least either security panel, the hole enabling the security panel to be locked to the upper portion of the door.

16. The roll container according to claim 1, wherein the side wall frames comprise an outer horizontal beam being dimensioned such that a flanked door having the upper and lower portions aligned is protected by said beam from lateral impacts.

17. The roll container according to claim 1, wherein the door, side and rear walls, bottom and top of the roll container are substantially closed.

18. The roll container according to claim 14, wherein the roll container comprises interlocking security panels which are configured to close the top side of the roll container for inhibiting access into the roll container.

19. The roll container according to claim 18, wherein the roll container comprises two interlocking security panels which:
   are at one end hinged to upper portions of opposing side wall frames, the other ends of the security panels being shaped with cooperating locking contours,
   comprise a locking interface to the roll container for securing the panels to a locked horizontal position.

20. The roll container according to claim 19, wherein the locking interface is a hole provided to at least either security panel, the hole enabling the security panel to be locked to the upper portion of the door.

* * * * *